US008251557B2

(12) United States Patent  
Erward et al.

(10) Patent No.: US 8,251,557 B2  
(45) Date of Patent: Aug. 28, 2012

(54) PRODUCTION METHOD FOR A HEADLIGHT LENS AND HEADLIGHT LENS FOR A MOTOR VEHICLE HEADLIGHT

(75) Inventors: Klaus Erward, Saalburg-Ebersdorf (DE); Franz Sykura, Schleiz/Lössau (DE)

(73) Assignee: Docter Optics GmbH (DE)

( * ) Notice: Subject to any disclaimer, the term of this patent is extended or adjusted under 35 U.S.C. 154(b) by 592 days.

(21) Appl. No.: 12/519,704

(22) PCT Filed: Dec. 13, 2007

(86) PCT No.: PCT/DE2007/002260  
§ 371 (c)(1),  
(2), (4) Date: Jun. 17, 2009

(87) PCT Pub. No.: WO2008/074304  
PCT Pub. Date: Jun. 26, 2008

(65) Prior Publication Data  
US 2010/0091511 A1   Apr. 15, 2010

(30) Foreign Application Priority Data  
Dec. 18, 2006   (DE) .................. 10 2006 060 141

(51) Int. Cl.  
*F21V 5/00* (2006.01)

(52) U.S. Cl. ....................... 362/520; 362/521

(58) Field of Classification Search ........... 362/459–549  
See application file for complete search history.

(56) References Cited

U.S. PATENT DOCUMENTS

| 3,708,221 | A | 1/1973 | Schaefer | |
|---|---|---|---|---|
| 5,922,250 | A * | 7/1999 | Ishikawa et al. | 264/1.7 |
| 2003/0210466 | A1 * | 11/2003 | Huang | 359/619 |
| 2005/0024889 | A1 | 2/2005 | Sugimoto | |
| 2005/0225999 | A1 | 10/2005 | Bucher | |
| 2005/0254254 | A1 * | 11/2005 | Moseler et al. | 362/520 |
| 2006/0072208 | A1 | 4/2006 | Bonitz et al. | |

FOREIGN PATENT DOCUMENTS

| BE | 393553 A | 2/1933 |
|---|---|---|
| CN | 1769228 | 5/2006 |
| DE | 19829586 A1 | 1/2000 |
| DE | 10043065 A1 | 3/2002 |
| DE | 10052653 A1 | 5/2002 |

(Continued)

OTHER PUBLICATIONS

German Official Action dated Sep. 20, 2011, issued in connection with German Application 11 2007 002 504.2.

*Primary Examiner* — William Carter  
(74) *Attorney, Agent, or Firm* — Barnes & Thornburg LLP

(57) ABSTRACT

The invention relates to a headlight lens for a vehicle headlight, particularly for a motor vehicle headlight, wherein the headlight lens comprises a bright-molded lens body made of a transparent material, having a substantially plane optically effective surface and a convexly curved optically effective surface, wherein the headlight lens comprises a lens edge on the outside of the convexly curved optically effective surface, wherein the substantially plane optically effective surface, protrudes over the lends edge, or over part of the lens edge, in a stepped manner in the direction of an optical axis of the headlight lens.

19 Claims, 8 Drawing Sheets

FOREIGN PATENT DOCUMENTS

| | | |
|---|---|---|
| DE | 10118687 A1 | 10/2002 |
| DE | 20320546 U1 | 4/2005 |
| DE | 202004005936 U1 | 4/2005 |
| DE | 102005009556 | 9/2005 |
| DE | 102005009556 A1 | 9/2005 |
| DE | 102004048500 A1 | 4/2006 |
| DE | 202006005261 | 6/2006 |
| EP | 0969246 | 1/2000 |
| EP | 1645545 | 9/2005 |
| EP | 1584863 | 10/2005 |
| EP | 1645545 | 4/2006 |
| GB | 1289776 | 9/1972 |
| JP | 59157603 | 9/1984 |
| KR | 102003069714 | 8/2003 |
| WO | WO 02/31543 A1 | 4/2002 |
| WO | WO 03/074251 A1 | 9/2003 |

* cited by examiner

PRODUCTION METHOD FOR A HEADLIGHT LENS AND HEADLIGHT LENS FOR A MOTOR VEHICLE HEADLIGHT

CROSS-REFERENCE TO RELATED APPLICATIONS

This application is the U.S. national phase of PCT/DE2007/002260 filed Dec. 13, 2007. PCT/DE2007/002260 claims the benefit under the Convention of German Patent Application No. 10 2006 060 141.6 filed Dec. 18, 2006.

FIELD OF THE INVENTION

The invention relates to a headlight lens for a vehicle headlight, in particular for a motor vehicle headlight, as well as to a vehicle headlight.

BACKGROUND INFORMATION

A headlight lens of that type is e.g. known from U.S. Pat. No. 3,708,221, WO 02/31543 A1, WO 03/074251 A1 and DE 100 52 653 A1. Further types of vehicle headlights are known e.g. DE 101 18 687 A1 and DE 198 29 586 A1.

DE 203 20 546 U1 discloses a lens blank-moulded on both sides and having a curved surface, a planar surface and a retention edge integrally moulded on the lens edge, wherein a supporting edge of a thickness of at least 0.2 mm and projecting with respect to the planar surface is integrally formed on the retention edge. Herein, the supporting edge is integrally formed on the outer circumference of the headlight lens. A further headlight lens having a supporting edge is disclosed e.g. by DE 10 2004 048 500 A1.

DE 20 2004 005 936 U1 discloses a lens for illuminating purposes, in particular a lens for a headlight for mapping or imaging light emitted from a light source and reflected by a reflector for generating a predetermined illumination pattern, said lens having two surfaces opposing each other, wherein areas of different optical dispersion effects are provided on at least a first surface.

EP 0 969 246 A2 discloses an over-dimensioned lens, wherein the lens grinding and the corresponding projection plane and projection parameter of the reflector mirror are dimensioned such with respect to the lens that only an interior partial area of the lens is used directly. The over-dimensioned edge area merely serves for an optical magnification of the headlight design.

With respect to their optical properties or their photometric standards, headlight lenses are subject to narrow criteria of design. This particularly applies to a light and dark borderline 75, as has been represented, by way of example, in a diagram 70 and a photo 71 in FIG. 9. Herein, the gradient G of the light and dark borderline 75 and the glare value HV of the vehicle headlight into which the headlight lens is installed are important photometric standard values.

It is the object of the invention to reduce the costs in manufacturing a headlight lens for a vehicle headlight, in particular for a motor vehicle headlight, without exceeding photometric standard values.

SUMMARY

The aforementioned problem is solved by a method for manufacturing a batch comprising at least five hundred or at least sixteen headlight lenses for a vehicle headlight or a motor vehicle headlight, wherein each headlight lens comprises a lens body made from transparent material and having an essentially planar, optically operative surface as well as a convexly curved, optically operative surface, the method comprising pressing a pre-form between a first mould for pressing the convexly curved, optically operative surface and a second mould for pressing the essentially planar, optically operative surface, which second mould comprises a first mould section and an annular second mould section enclosing the first mould section, wherein due to the pressing a headlight lens of the batch is formed, the headlight lens having an integrally formed lens edge, wherein, by means of an offset depending on the volume of the pre-form a step is pressed into the headlight lens between the second mould section and the first mould section, and wherein the first mould section is set back with respect to the second mould section at least in the region of the offset such that the height of a step of a headlight lens of the batch differs by more than 0.05 mm from the height of a step of a further headlight lens of the batch.

In particular, it is provided that the essentially planar, optically operative surface is an optically operative surface to be made facing a light source. In particular, it is provided that the convexly curved, optically operative surface is an optically operative surface to be made facing away from a light source. In an embodiment, the convexly curved, optically operative surface is aspheric.

In the sense of the invention, the transparent material is in particular glass. In the sense of the invention, the term blank-moulding is to mean, in particular, that an optically operative surface is to be pressed such that a subsequent finishing step of the contour of this optically operative surface may be dispensed with or is omitted or is not provided. An integrally formed lens edge, when taken in the sense of the invention, is in particular not to comprise an optically operative surface.

In an embodiment of the invention, the step extends essentially parallel to the optical axis of the headlight lens. In another embodiment, the step is (if necessary additionally) inclined with respect to the optical axis of the headlight lens in the direction of the optical axis.

In a yet further embodiment of the invention, the distance between the first mould section and the first mould is dependent on the volume of the pre-form. In a further embodiment of the invention, the distance between the second mould section and the first mould is independent of the volume of the pre-form. In a yet further preferred embodiment of the invention, the second mould section contacts the first mould. In a still further embodiment of the invention, a contact shoulder is pressed into the lens edge by means of the first mould, wherein the contact shoulder expediently extends essentially orthogonally with respect to the optical axis of the headlight lens.

In a yet further embodiment of the invention, the essentially planar, optically operative surface projects by no more than 1 mm, advantageously by not more than 0.5 mm beyond the lens edge or a part of the lens edge when seen in the direction of the optical axis of the headlight lens. This in particular means that the height of a step amounts to no more than 1 mm, advantageously no more than 0.5 mm.

In a further expedient embodiment of the invention, the thickness of the lens edge amounts to at least 2 mm. In a yet further embodiment of the invention, the thickness of the lens edge amounts to no more than 5 mm.

In a still further embodiment of the invention, the diameter of the headlight lens amounts to at least 40 mm. In a yet further embodiment of the invention, the diameter of the headlight lens amounts to no more than 100 mm.

In still another embodiment of the invention, the diameter of the essentially planar, optically operative surface amounts to no more than 110% of the diameter of the convexly curved, optically operative surface. In a still further expedient embodiment of the invention, the diameter of the essentially planar, optically operative surface amounts to at least 90% of the diameter of the convexly curved, optically operative surface.

In an embodiment of the invention, the essentially planar, optically operative surface and/or the convexly curved, optically operative surface is round, in particular circular, or essentially circular.

In a further embodiment of the invention, the surface of the lens edge or essentially a predominant or at least a predominant or essential portion of the surface of the lens edge extends essentially parallel to the optical axis of the headlight lens along the outer circumference of the lens edge. In this sense, essentially parallel to the optical axis is to mean or is to comprise in particular an inclination of 0° up to 8°, in particular 0° to 5°, with respect to the optical axis.

In an embodiment, the essentially planar, optically operative surface and/or the convexly curved, optically operative surface has a roughness of less than 0.1 µm, in particular less than 0.08 µm, at least in more than one half thereof or essentially in its totality. Roughness in the sense of the invention is in particular to be defined as Ra, in particular according to ISO 4287.

The above-mentioned problem is moreover solved by a method for producing a batch of, in particular, at least sixteen or at least fifty-three headlight lenses for a vehicle headlight, wherein the headlight lenses of the batch are blank-moulded according to the aforementioned process. In an embodiment of the invention, the batch comprises at least five hundred headlight lenses. In a further embodiment of the invention, the headlight lenses are placed in a transport container for transporting the headlight lenses. In yet a further expedient embodiment of the invention, the height of a step of a headlight lens of the batch differs by more than 0.05 mm, advantageously by more than 0.1 mm, from the height of a step of a further headlight lens of the batch. In an embodiment of the invention, the step extends essentially parallel to the optical axis of the headlight lens. In a further embodiment, the step is, if necessary additionally, inclined with respect to the optical axis of the headlight lens when seen in the direction of the optical axis.

The above-mentioned problem is moreover solved by a batch of, in particular, at least sixteen or at least fifty-three blank-moulded headlight lenses for vehicle headlights having an integrally moulded lens edge, wherein each one of the headlight lenses of the batch comprises a lens body, each, made of transparent material with an essentially planar, optically operative surface, each, and a convexly curved, optically operative surface, each, wherein the essentially planar, optically operative surfaces project, in the form of a step and when seen in the direction of each optical axis of a headlight lens, beyond the respective lens edge or part of the respective lens edge, and wherein the height of a step of a headlight lens of the batch differs by more than 0.05 mm, advantageously by more than 0.1 mm, from the height of a step of a further headlight lens of the batch. In an embodiment of the invention, the step extends essentially parallel to the optical axis of the headlight lens. In another embodiment, the step is, if necessary in addition, inclined with respect to the optical axis of the headlight lens when seen in the direction of the optical axis.

In an expedient embodiment of the invention, the batch comprises at least five hundred headlight lenses. In a further embodiment of the invention, the headlight lenses of the batch have a contact shoulder, each, on the lens edge situated on the side of the respective headlight lenses facing away from the step, wherein the contact shoulder advantageously extends essentially orthogonally with respect to the optical axis of the headlight lens.

In a further expedient embodiment of the invention, the essentially planar, optically operative surface projects, when seen in the direction of the optical axis of the headlight lens, beyond the lens edge or part of the lens edge by no more than 1 mm, advantageously by no more than 0.5 mm. This, in particular, means that the height of a step is no more than 1 mm, advantageously no more than 0.5 mm.

In yet a further expedient embodiment of the invention, the thickness of the lens edge is at least 2 mm. In a yet further embodiment of the invention, the thickness of the lens edge is no more than 5 mm.

In a yet further embodiment of the invention, the diameter of the headlight lens amounts to at least 40 mm. In a further embodiment of the invention, the diameter of the headlight lens amounts to no more than 100 mm.

In a still further expedient embodiment of the invention, the diameter of the essentially planar, optically operative surface amounts to no more than 110% of the diameter of the convexly curved, optically operative surface. In a yet further expedient embodiment of the invention, the diameter of the essentially planar, optically operative surface amounts to at least 90% of the diameter of the convexly curved, optically operative surface.

In an embodiment of the invention, the essentially planar, optically operative surface and/or the convexly curved, optically operative surface is round, in particular circular or essentially circular.

In a yet further expedient embodiment of the invention, the surface of the lens edge or at least a predominant or essential part of the surface of the lens edge extends along the outer circumference of the lens edge essentially parallel to the optical axis of the headlight lens. In the sense thereof, "essentially parallel to the optical axis" is to mean or comprise, in particular, an inclination with respect to the optical axis of 0° to 8°, in particular 0° to 5°.

The essentially planar, optically operative surface and/or the convexly curved, optically operative surface in an embodiment has, in more than half thereof or essentially in its totality, a roughness of less than 0.1 µm, in particular of less than 0.08 µm. Roughness, in the sense of the invention, is to be defined, in particular, as Ra, particularly according to ISO 4287.

The aforementioned is moreover solved by a transport container for transporting headlight lenses, wherein a plurality of headlight lenses for vehicle headlights, in particular for motor vehicle headlights, is arranged in the transport container, wherein each one of the headlight lenses of said plurality of headlight lenses comprises a blank-moulded lens body made of transparent material with an essentially planar, optically operative surface, each, and with an convexly curved, optically operative surface, each, and wherein each of the headlight lenses of the plurality of headlight lenses externally comprises a lens edge, each, on their convexly curved, optically operative surfaces, wherein the essentially planar, optically operative surfaces, when seen in the direction of the respective optical axis of a headlight lens, project, in the form of a step, beyond the respective lens edge or a part of the respective lens edge, and wherein the height of a step of a headlight lens of said plurality of headlight lenses differs by more than 0.05 mm, preferably by more than 0.1 mm, from the height of a step of a further headlight lens of said plurality of headlight lenses. In an embodiment of the invention, the step extends essentially parallel to the optical axis of the headlight lens. In another embodiment, the step is, if necessary additionally, inclined with respect to the optical axis of the headlight lens when seen in the direction of the optical axis.

The aforementioned problem is moreover solved by a headlight lens for a vehicle headlight, in particular for a motor vehicle headlight, wherein the headlight lens comprises a blank-moulded lens body made from transparent material and having an essentially planar, optically operative surface and a convexly curved, optically operative surface, and wherein the headlight lens, on the convexly curved, optically operative surface, externally comprises a lens edge, wherein the essentially planar, optically operative surface, when seen in the direction of an optical axis of the headlight lens, projects beyond the lens edge or a part of the lens edge in a stepped manner, and wherein the headlight lens has a contact shoulder on the lens edge on the side of the headlight lens facing away from the step, wherein the contact shoulder advantageously extends essentially orthogonally with respect to the optical axis of the headlight lens, and wherein the essentially planar, optically operative surface advantageously has a roughness of less than 0.1 µm, in particular of less than 0.8 µm. Roughness, in the sense of the invention, is particularly to be defined as Ra, in particular according to ISO 4287.

In an embodiment of the invention, the step extends essentially parallel to the optical axis of the headlight lens. In another embodiment, the step is, if necessary in addition, inclined with respect to the optical axis of the headlight lens when seen in the direction of the optical axis.

In a yet further expedient embodiment of the invention, the essentially planar, optically operative surface projects beyond the lens edge or a part of the lens edge, when seen in the direction of the optical axis, by not more than 1 mm, expediently by not more than 0.5 mm. This, in particular, means that the height of a step amounts to no more than 1 mm, advantageously to no more than 0.5 mm.

In a further expedient embodiment of the invention, the thickness of the lens edge amounts to at least 2 mm. In a further expedient embodiment of the invention, the thickness of the lens edge amounts to no more than 5 mm.

In yet a further embodiment of the invention, the diameter of the headlight lens amounts to at least 40 mm. In still a further embodiment of the invention, the diameter of the headlight lens amounts to no more than 100 mm.

In a further embodiment of the invention, the diameter of the essentially planar, optically operative surface amounts to no more than 110% of the diameter of the convexly curved, optically operative surface. In a yet further embodiment of the invention, the diameter of the essentially planar, optically operative surface amounts to at least 90% of the diameter of the convexly curved, optically operative surface.

In an embodiment of the invention, the essentially planar, optically operative surface and/or the convexly curved, optically operative surface is round, in particular circular or essentially circular.

In an embodiment, the convexly curved, optically operative surface has, for more than half of it or taken essentially in its totality, a roughness of less than 0.1 µm, in particular of less than 0.8 µm. Roughness, in the sense of the invention, is particularly to be defined as Ra, in particular according to ISO 4287.

The aforementioned problem is furthermore solved by a vehicle headlight, in particular a motor vehicle headlight, having a light source, a shield and a headlight lens in particular comprising one or several of the above-mentioned features, for imaging an edge of the shield as a light and dark borderline, wherein the headlight lens comprises a blank-moulded lens body made from transparent material and having a particularly essentially planar, optically operative surface facing the light source and a particularly convexly curved, optically operative surface facing away from the light source, and wherein the headlight lens, on the optically operative surface facing away from the light source, externally comprises a lens edge, wherein the optically operative surface facing the light source projects beyond the lens edge or a part of the lens edge when seen in the direction of an optical axis of the headlight lens and/or in the direction of the light source, wherein a step is provided between the optically operative surface facing the light source and a surface of the lens edge facing the light source, wherein the headlight lens has a contact shoulder advantageously on the lens edge on the side of the headlight lens facing away from the step, and wherein the essentially planar, optically operative surface advantageously has a roughness of less than 0.1 µm, in particular of less than 0.08 µm.

Roughness, in the sense of the invention, is particularly to be defined as Ra, in particular according to ISO 4287. In an embodiment of the invention, the step extends essentially parallel to the optical axis of the headlight lens. In another embodiment, the step is, if necessary additionally, inclined with respect to the optical axis of the headlight lens when seen in the direction of the optical axis.

In an expedient embodiment of the invention, the vehicle headlight is (at least as well) formed as a non-dazzling headlight. In yet a further embodiment of the invention, the gradient of the light and dark borderline is no more than 0.5. In a yet further embodiment of the invention, the glare value of the vehicle headlight is no more than 1.5 Lux.

The above-mentioned problem is moreover solved by a vehicle having an aforementioned vehicle headlight, wherein the light and dark borderline may, in an embodiment of the invention, be imaged on a roadway on which the motor vehicle may be arranged.

The height of the aforementioned steps advantageously amounts to at least 0.1 mm.

It may be provided that an essentially planar, optically operative surface comprises a (concave) curvature having a radius of curvature in the order of 0.5 m.

Further advantages and details may be taken from the following specification of examples of embodiment.

DETAILED DESCRIPTION

Figure 1:
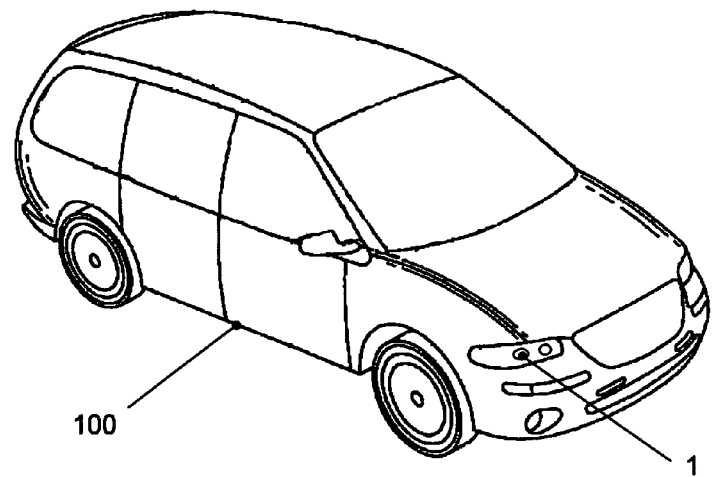
FIG. 1 shows a motor vehicle.
Figure 2:
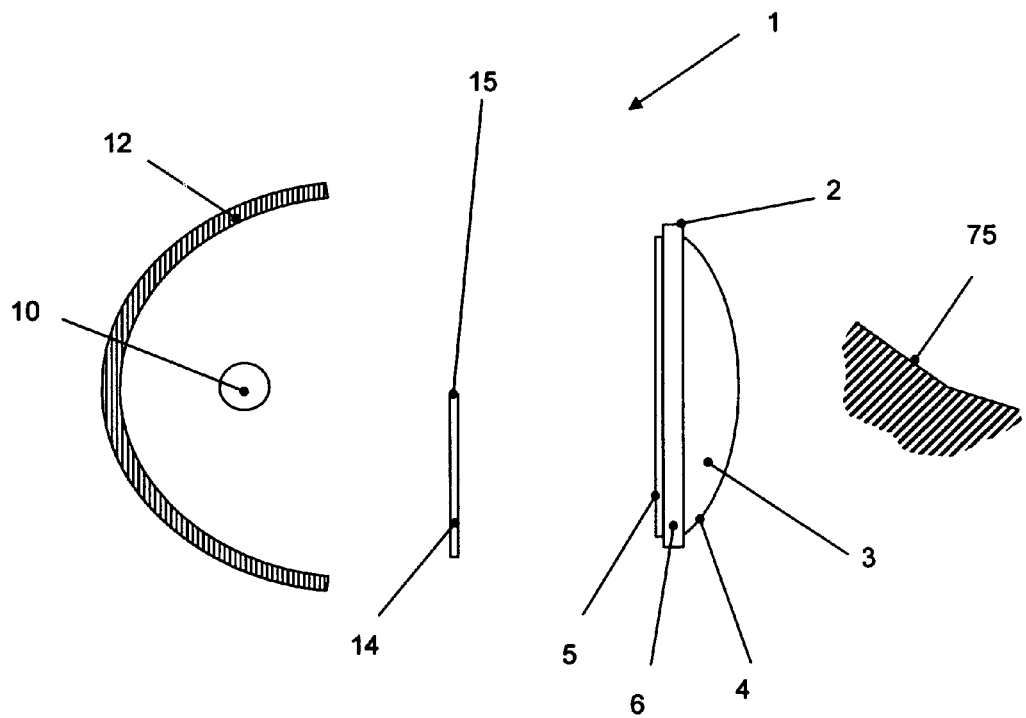
FIG. 2 shows a schematic representation of a vehicle headlight.

FIG. 1 shows a motor vehicle 100 having a vehicle headlight 1 schematically depicted in FIG. 2 and having a light source 10 for generating light, a reflector 12 for reflecting light to be generated by means of the light source 10, and a shield 14. The vehicle headlight 1 moreover comprises a one-piece headlight lens 2 blank-moulded on both sides, for changing the beam direction of light to be generated by means of the light source 10, and in particular for imaging an edge of the shield 14 as a light and dark borderline 75 (also see FIG. 9), which edge has been designated by reference numeral 15 in FIG. 2.

The headlight lens 2 comprises a lens body 3 made from transparent material, in particular glass, which body includes an essentially planar, optically effective and operative surface 5 facing the light source 10, and a convexly curved, optically effective and operative surface 4 facing away from the light source 10. The headlight lens 2 moreover comprises an integrally formed lens edge 6, by means of which the headlight lens 2 may be attached inside the vehicle headlight 1. The elements in FIG. 2 have been drafted in particular consideration of simplicity and clearness but not necessarily to scale. For example, the order of magnitude of some elements has been exaggerated with respect to other elements in order to improve comprehension of the example of embodiment of the present invention.

Figure 3:
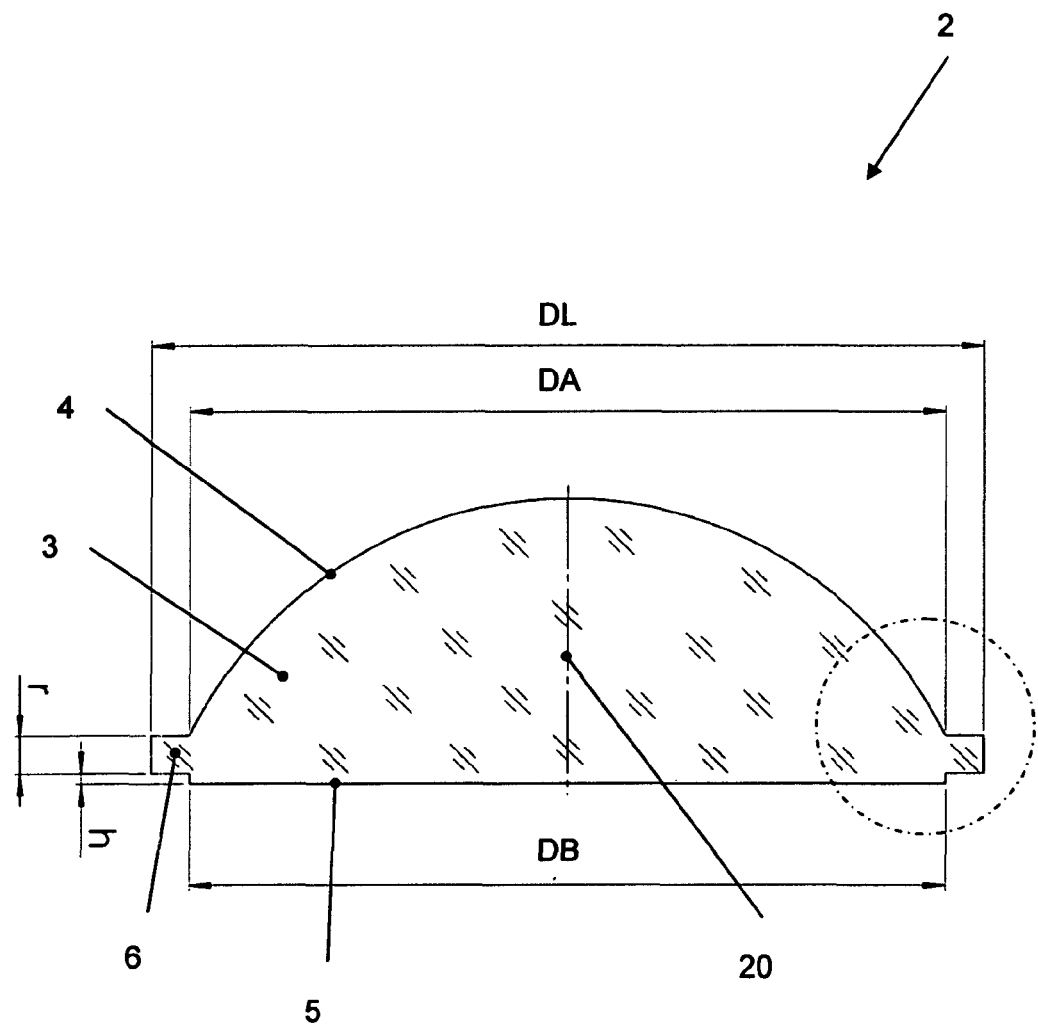
FIG. 3 shows a cross-section through an example of embodiment of a headlight lens for a vehicle headlight according to FIG. 2.
Figure 4:
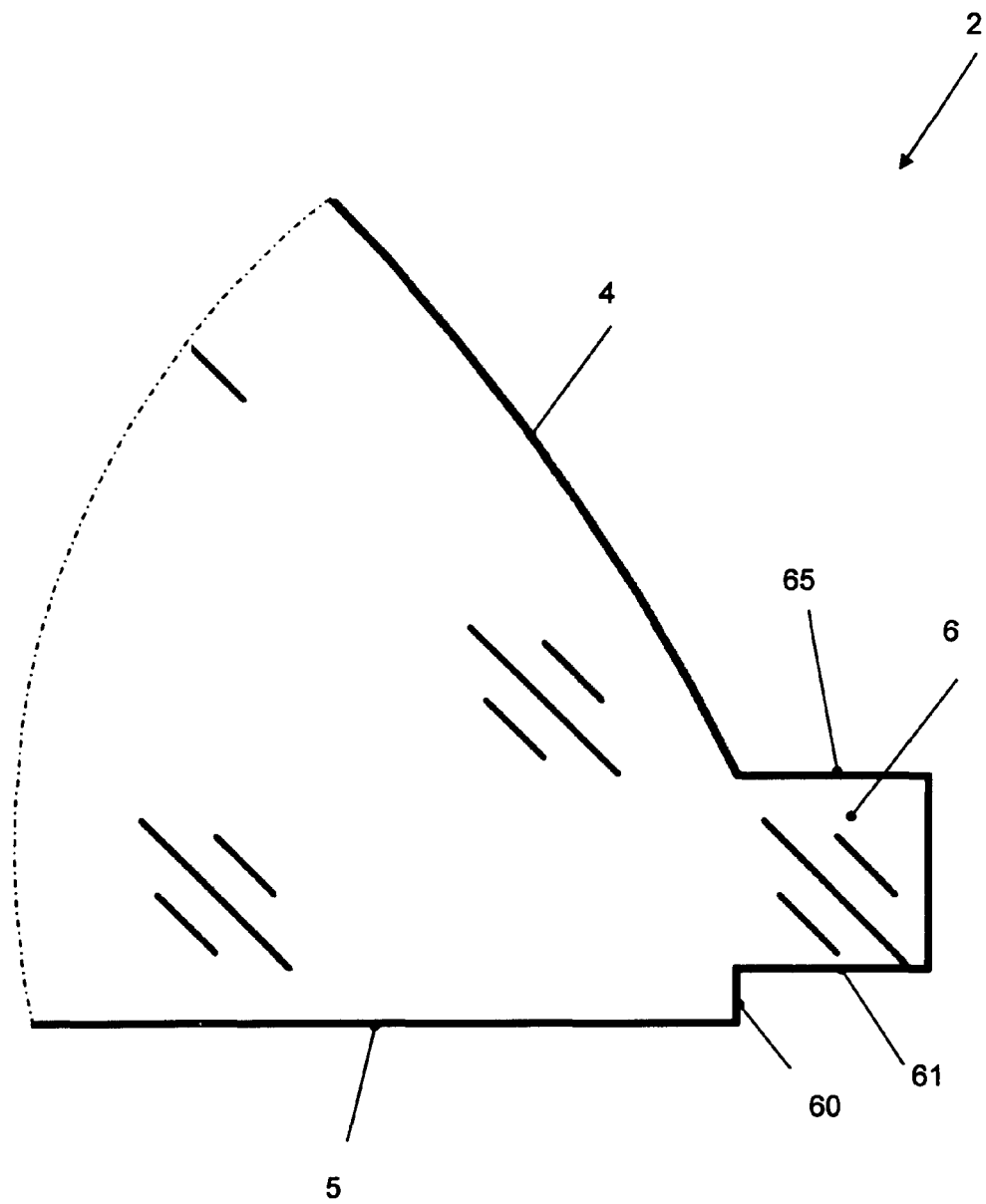
FIG. 4 shows a cut-out of the cross-section according to FIG. 3.

FIG. 3 shows a cross-section through an example of embodiment of the headlight lens 2 for the vehicle headlight 1 according to FIG. 2. FIG. 4 shows a cut-out of the headlight lens 2, said cut-out having been marked by a dashed-dotted circle. The essentially planar, optically effective surface 5 projects, in the shape of a cascade or step 60, beyond the lens edge 6 or beyond the surface 61 of the lens edge 6 facing the light source 10 in the direction of the optical axis 20 of the headlight 2, wherein the height h of the step 60 is no more than 1 mm, advantageously no more than 0.5 mm. The nominal value of the height h of the step 60 advantageously amounts to 0.2 mm. Moreover, the headlight lens 2 has a contact shoulder 65 on the lens edge 6 on that side of the headlight lens 2 which faces away form the step 60.

The thickness r of the lens edge 6 amounts to at least 2 mm, however, to no more than 5 mm. The diameter DL of the headlight lens 2 amounts to at least 40 mm, however, to no more than 100 mm. The diameter DB of the essentially planar, optically effective surface 5 is equal to the diameter DA of the convexly curved, optically effective surface 4. In an expedient embodiment, the diameter DB of the essentially planar, optically effective surface 5 amounts to no more than 110% of the diameter DA of the convexly curved, optically effective surface 4. Furthermore, the diameter DB of the essentially planar, optically effective surface 5 advantageously amounts to at least 90% of the diameter DA of the convexly curved, optically effective surface 4. Advantageously, the diameter DL of the headlight lens 2 is roughly 5 mm larger than the diameter DB of the essentially planar, optically effective surface 5 or than the diameter DA of the convexly curved optically, effective surface 4.

Figure 5:
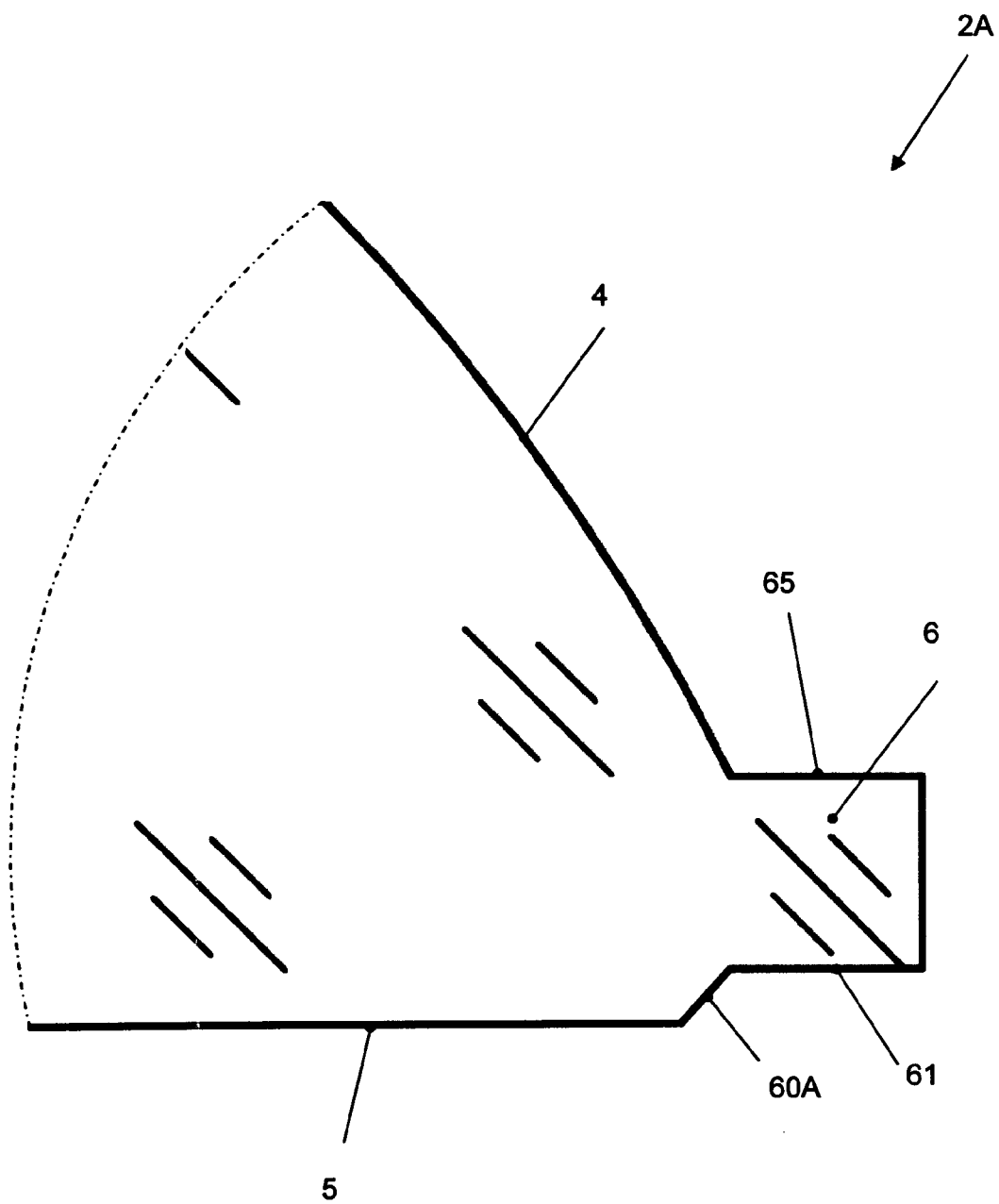
FIG. 5 shows; by way of a cut-out; a cross-section through a modified example of embodiment of a headlight lens for a vehicle headlight according to FIG. 2.

FIG. 5 shows a headlight lens 2A modified with respect to headlight lens 2, wherein same reference numerals as having been used with respect to headlight lens 2 denominate same or similar objects. As a modification with regard to headlight lens 2, headlight lens 2A has an oblique step 60A (e.g. inclined by 45°).

Figure 6:
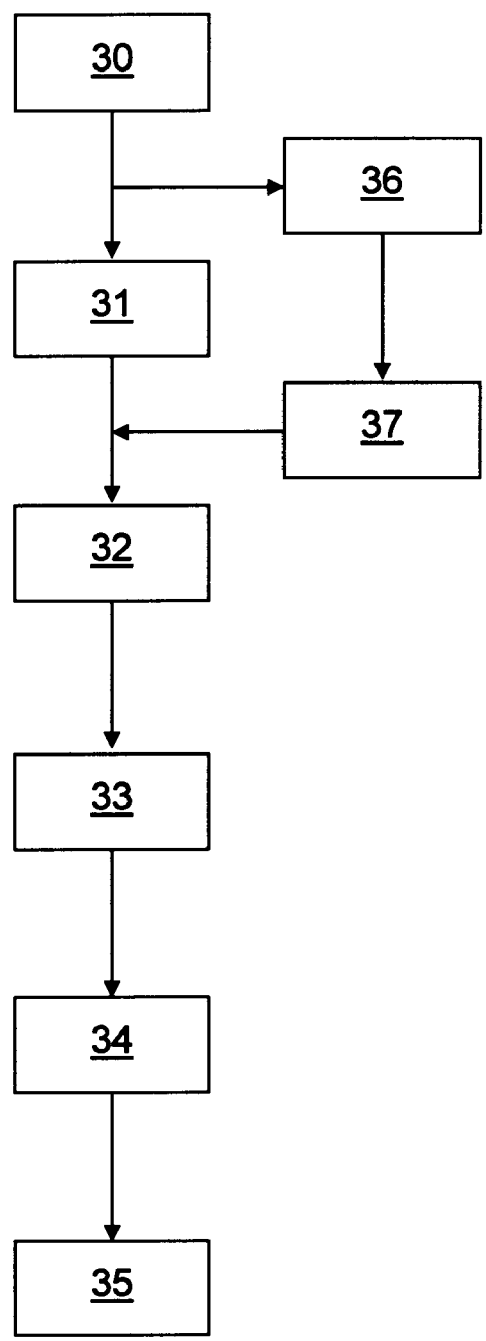
FIG. 6 shows a method for manufacturing a headlight lens according to FIG. 3.

FIG. 6 shows a process for manufacturing the headlight lens 2. Herein, the manufacture of a pre-form, such as e.g. of a gob, occurs in a step 30. To this end, glass is melted in a melting device such as a trough. The melting device may comprise e.g. a controllable outlet. Liquid glass is passed from the melting device into a pre-form device. This pre-form device may include e.g. moulds into which a defined amount of glass is poured. It may also be provided that the pre-form device is designed as in injection press for pressing pre-forms which, if necessary, are close to their final contour. It has been provided that the volume of the pre-form may deviate by up to 3% from the nominal or index value of the pre-form.

A step 31 follows, in which step the pre-form is transferred to a tempering device by means of which the thermal gradient of the pre-form is reversed. Optionally, the pre-form is cooled in a step 36 and warmed up or heated in a step 37 after an indefinite period of time has lapsed.

Figure 7:
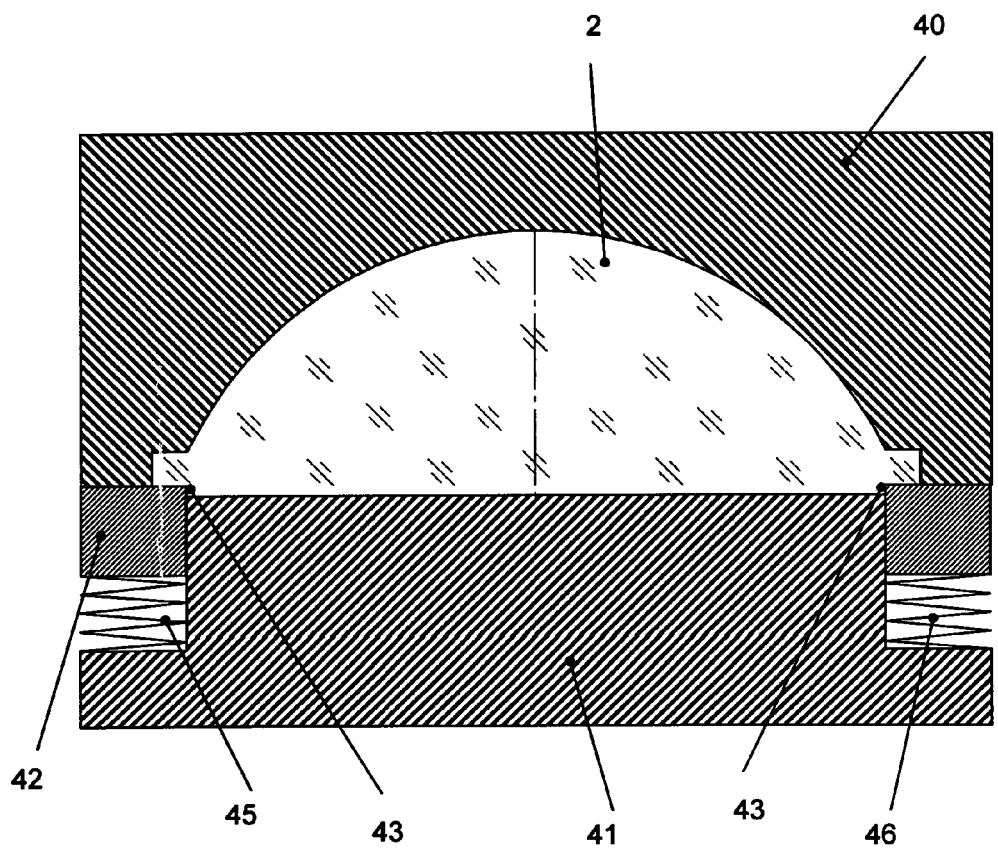
FIG. 7 shows an apparatus for pressing a headlight lens according to FIG. 3.

A step 32 follows in which the pre-form is blank-moulded—by means of an apparatus for pressing a headlight lens as shown in FIG. 7—between a first mould 40 and a second mould, the latter comprising a first mould section 41 and a second mould section 42 which is annular and encloses the first mould section 41, to form a headlight lens 2 having an integrally moulded lens edge 6, wherein the cascade or step 60 is pressed into the headlight lens 2 by means of an offset 43 depending on the volume of the pre-form, which pressing occurs between the first mould section 41 and the second mould section 42. Herein, the pressing is, in particular, not performed in vacuum or under significant low-pressure. The pressing particularly occurs under air-pressure (atmospheric pressure). The first mould section 41 and the second mould section 42 are non-positively coupled together by means of springs 45 and 46. Herein, the pressing is performed such that the distance between the first mould section 41 and the first mould 40 is dependent on the volume of the pre-form or of the headlight lens 2 pressed from it, and the distance between the second mould section 42 and the first mould 40 is independent of the volume of the pre-form or of the headlight lens 2 pressed from it.

Figure 8:
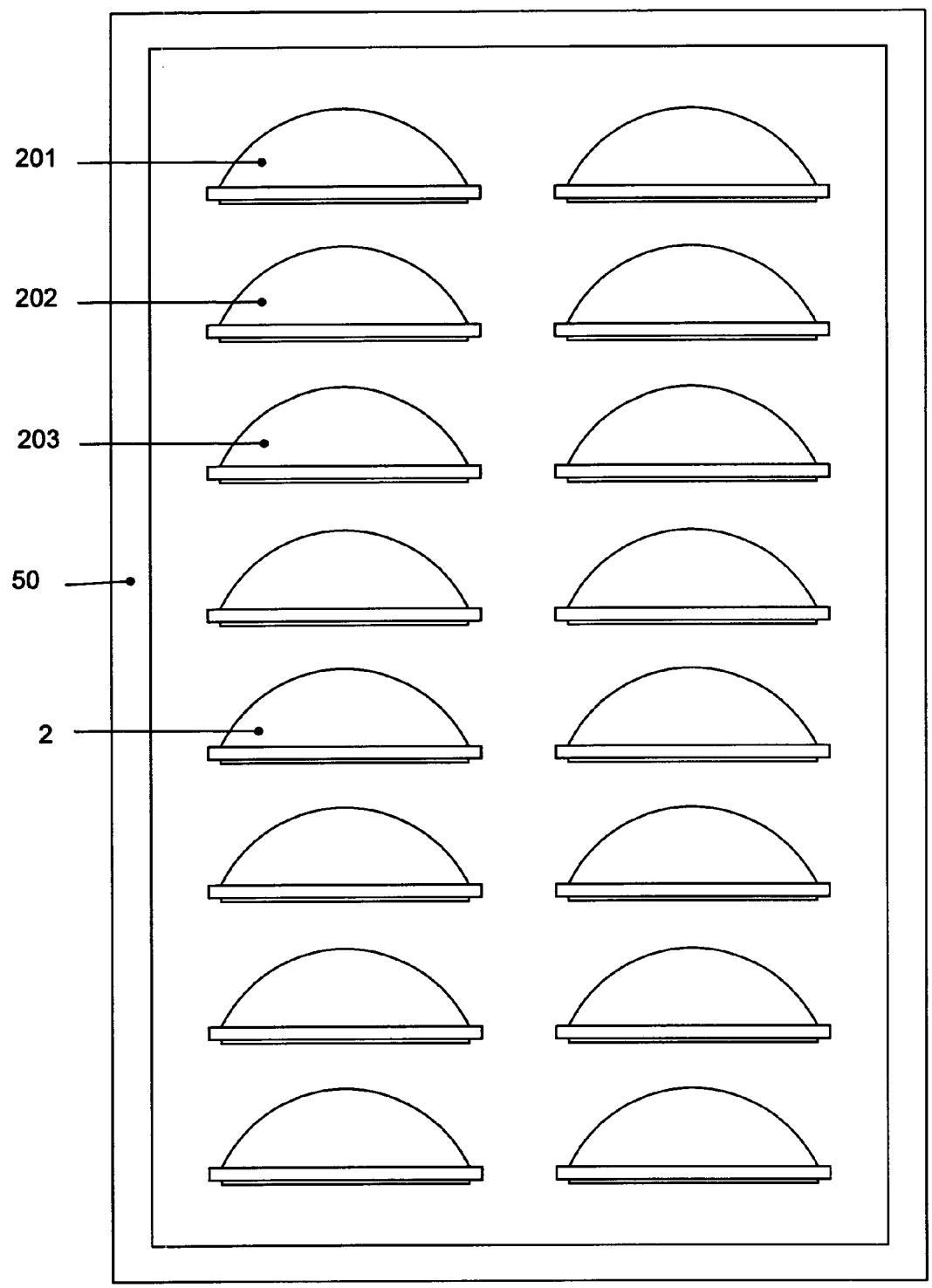
FIG. 8 shows a transport container for transporting a plurality of headlight lenses.

After pressing, and in a step 33, the headlight lens 2 is placed on a cooling track and cooled. An optional step 34 follows, in which the essentially planar surface 5 is polished. Subsequently, and in a step 35, the headlight lens 2 is packaged into a transport container 50 represented in FIG. 8 for transporting headlight lenses together with further headlight lenses 201, 202, 203 of the batch, all designed corresponding to headlight lens 2. In the transport container 50, the height of a step of a headlight lens 201 differs by more than 0.05 mm, advantageously by more than 0.1 mm, from the height of a step of a further headlight lens 203.

Figure 9:
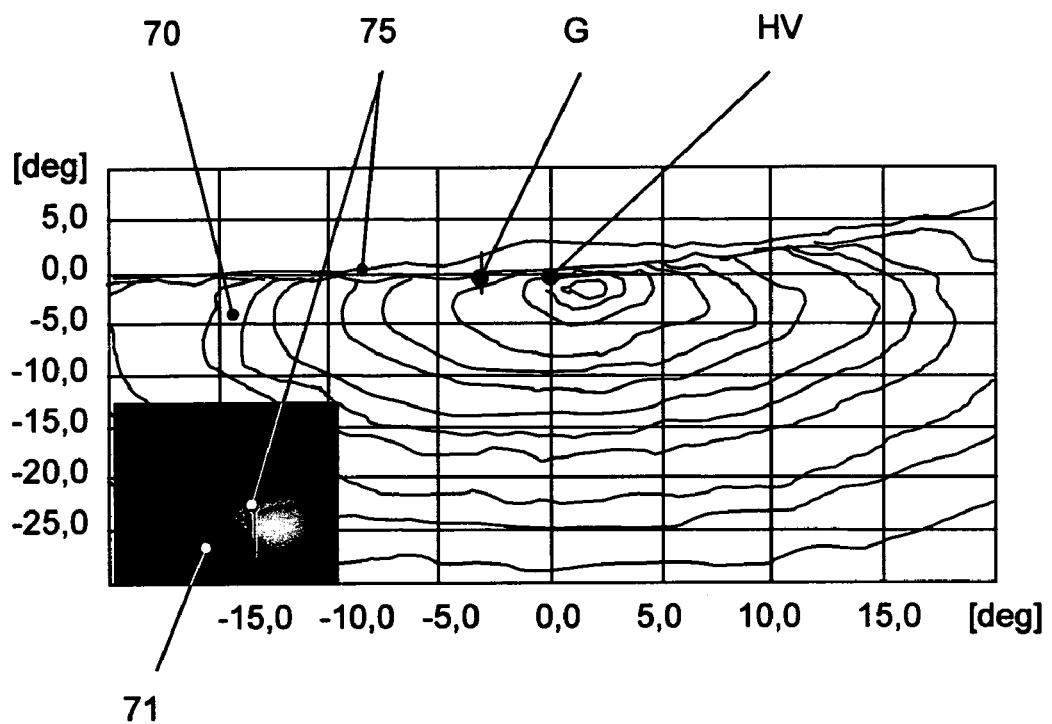
FIG. 9 shows the distribution of illumination of a headlight.

It has shown that the lens designed according to the invention is robust with regard to its optical properties such that the required optical properties as they have been explained e.g. referring to FIG. 9 may be matched even in the case of the aforementioned deviations of the volume of the pre-form. Thereby, the aforementioned deviations regarding the volume of the pre-form may be tolerated, and the costs for producing such a headlight lens may be reduced.

The invention claimed is:

1. Method for manufacturing a batch of headlight lenses for a vehicle headlight, wherein each headlight lens comprises a lens body made from transparent material and having an essentially planar, optically operative surface as well as a convexly curved, optically operative surface and an optical axis, wherein each lens in the batch has substantially a same convexly curved, optically operative surface, the method comprising providing first mould for moulding the convexly curved, optically operative surface, providing a second mould for moulding the essentially planar, optically operative surface, which second mould comprises a first mould section and an annular second mould section enclosing the first mould section, the first mould section being movable with respect to the annular second mould section, providing a pre-form having a volume, moulding the pre-form using the first mould and second mould to form the headlight lens with an integrally formed lens edge formed by an offset depending on the volume of the pre-form a step is pressed into the headlight lens of the second mould section with respect to the first mould section, and wherein the first mould section is set back with respect to the second mould section at least in a region of the offset such that a height of a step of headlight lens of the batch differs from the height of a step of at least one further headlight lens of the batch.

2. Method as claimed in claim 1, further comprising determining a distance between the first mould section and the first mould based on the volume of the pre-form.

3. Method as claimed in claim 2, further comprising determining a distance between the second mould section and the first mould independent of the volume of the pre-form.

4. Method as claimed in claim 3, further comprising the step of the second mould section contacts the first mould.

5. Method as claimed in claim 1, further comprising the step of the first mould moulding a contact shoulder into the lens edge.

6. Method as claimed in claim 5, wherein the contact shoulder extends essentially orthogonally with respect to the optical axis of the headlight lens.

7. Method as claimed in claim 1, wherein the essentially planar, optically operative surface projects beyond the lens edge or a part of the lens edge by no more than 1 mm when seen in the direction of the optical axis of the headlight lens.

8. Method as claimed in claim 1, wherein the thickness of the lens edge amounts to at least 2 mm.

9. Method as claimed in claim 1, wherein the thickness of the lens edge amounts to no more than 5 mm.

10. Method as claimed in claim 1, wherein the diameter of the essentially planar, optically operative surface amounts to no more than 110% of the diameter of the convexly curved, optically operative surface.

11. Method as claimed in claim 1, wherein the diameter of the essentially planar, optically operative surface amounts to at least 90% of the diameter of the convexly curved, optically operative surface.

12. Method as claimed in claim 1, wherein the headlight lenses are placed in a transport container for transporting the headlight lenses.

13. Method as claimed in claim 1, wherein the height of a step of a headlight lens of the batch differs by more than 0.1 mm from the height of a step of at least one further headlight lens of the batch.

14. The method of claim 1 wherein during the moulding step the first mould section moves with respect to the annular second mould section.

15. The method of claim 14 further comprising providing spring means coupling the first mould section with respect to the annular second mould section.

16. The method of claim 1 wherein the pre-form is glass.

17. A method for manufacturing a batch comprising at least sixteeen vehicle headlight lenses each comprising a lens body made from transparent material and having an essentially planar, optically operative surface as well as a convexly curved, optically operative surface and an optical axis, wherein each lens has substantially the same convexly curved, optically operative surface, the method comprising providing first mould for moulding the convexly curved optically operative surface, providing a second mould for moulding the essentially planar, optically operative surface, which second mould comprises a first mould section and an annular second mould section enclosing the first mould section, the first mould section being movable with respect to the annular second mould section, providing a pre-form having a volume, moulding the pre-form using the first mould and second mould to form the headlight lens with an integrally formed lens edge, and providing the first mould section set back with respect to the second mould section at least in the region of the offset such that a height of a step of a headlight lens of the batch differs by more than 0.05 mm from a height of a step of at least one further headlight lens of the batch.

18. The method of claim 17 further comprising determining a distance between the first mould section and the first mould based on the volume of the pre-form.

19. A method for manufacturing a batch comprising at least sixteeen vehicle headlight lenses each comprising a lens body made from transparent material and having an essentially planar, optically operative surface as well as a convexly curved, optically operative surface and an optical axis, wherein each lens has substantially the same convexly curved, optically operative surface, the method comprising providing first mould for moulding the convexly curved optically operative surface, providing a second mould for moulding the essentially planar, optically operative surface, which second mould comprises a first mould section and an annular second mould section enclosing the first mould section, the first mould section being movable with respect to the annular second mould section, providing a pre-form having a volume, moulding the pre-form using the first mould and second mould to form the headlight lens with an integrally formed lens edge, and providing the first mould section set back with respect to the second mould section at least in the region of the offset such that a height of a step of a headlight lens of the batch differs from a height of a step of at least one further headlight lens of the batch.

* * * * *